G. M. HENRIE.
SPRING WHEEL.
APPLICATION FILED SEPT. 11, 1920.

1,420,839.

Patented June 27, 1922.

Inventor:
GEORGE M. HENRIE,
By John W. Bruninga
His Attorney.

UNITED STATES PATENT OFFICE.

GEORGE M. HENRIE, OF ST. LOUIS, MISSOURI, ASSIGNOR OF ONE-THIRD TO JOHN W. STOVERINK AND ONE-THIRD TO WILLIAM A. MUELLER, BOTH OF ST. LOUIS, MISSOURI.

SPRING WHEEL.

1,420,839.                    Specification of Letters Patent.    Patented June 27, 1922.

Application filed September 11, 1920. Serial No. 409,571.

*To all whom it may concern:*

Be it known that I, GEORGE M. HENRIE, a citizen of the United States, and residing at St. Louis, Missouri, have invented the new and useful Improvement in Spring Wheels, of which the following is a specification.

This invention relates to spring wheels or such as are provided with a resilient connection between the axle and the rim adapted to ease the shocks to the vehicle due to inequalities of the road.

One of the objects of this invention is to provide a yielding suspension between the axle and the wheel adapted to take up the jars of the road and to permit driving the wheel from the axle.

Another object of this invention is to provide a spring wheel of novel form which shall be simple in construction reliable and durable in operation and cheap to manufacture.

Further objects will appear from the following description taken in connection with the accompanying drawing, in which.

Figure 1:
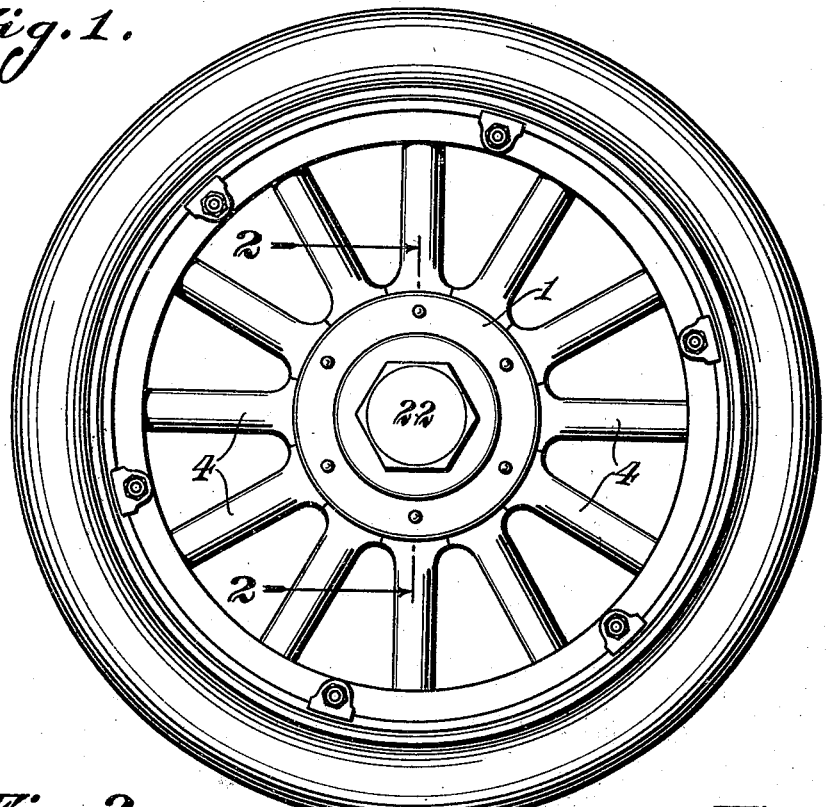
Figure 1 shows this invention applied to an automobile wheel.
Figure 2:
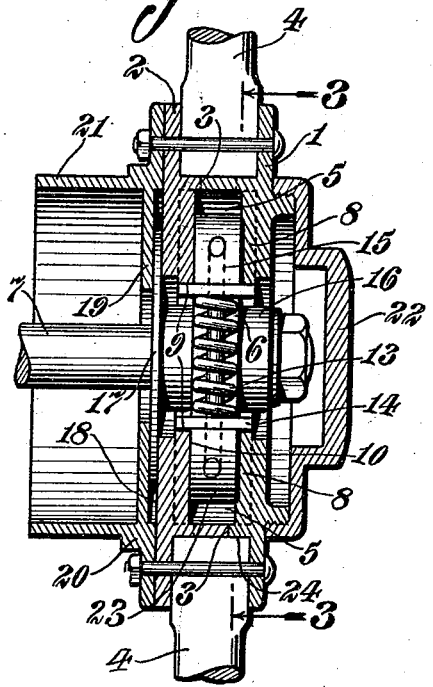
Figure 2 is a sectional view showing the connection between the hub and the axle and taken on line 2—2 of Figure 3.

Referring now to the accompanying drawing, 1 designates a section of the hub adapted to engage a similar opposite section 2 by means of a cylindrical dove-tail joint as indicated at 3. The parts 1 and 2 fit together at the joint 3 so as to form a hollow hub, the outer portion of which is provided with a socket adapted to accommodate the spokes 4 and the inner portion of which is provided with a chamber 5 adapted to accommodate the movable member 6 fixed to the axle 7 in any suitable manner. The interior of the chamber 5 is provided with blocks 8 having angular faces 9 adapted to form abutments, and radial faces 10 adapted to form guides for the movable member 6.

The member 6 has the general form of a circular disc having three or more peripheral notches 11, whose ends are adapted to form abutments 12. Within each notch 11 is a stiff spring 13 confined between cross pieces 14 adapted to engage the abutments 12. A pin or rod 15 passes through each spring 13 and its cross pieces 14 and has its ends fixed in the abutments 12. The members 14 fit loosely over the pins 15 so as to be movable therealong.

In assembling the device, the movable member 6 with its springs 13 and cross pieces 14 assembled thereon, is placed in one of the hub members, say 2, with the members 14 engaging the abutments 9 thereof. The other hub member 1 is then assembled so that the members 14 will also engage the abutments 9 thereon. When so assembled, each spring 13 with a corresponding pair of cross pieces 14 will be confined between a pair of abutments 12 on the movable member 6, and said cross pieces 14 will in addition, each engage a pair of abutments 9 on the hub members 1 and 2.

The movable member 6 has a hub 16 upon which may be mounted a disc 17 adapted to lie against the outer face 18 of the hub member 2, being confined between said face and a flange 19 upon an auxiliary member 20 bolted to the hub member 2 and upon which, for convenience sake, a brake drum 21 may also be mounted. The hub members 1 and 2 and the flange 19 have central openings large enough to allow the hub 16 and the axle 7 to play back and forth about the center of the wheel. There is also sufficient room between the face 18 and the flange 19 to allow similar play for the disc 17 which is thereby adapted to act as a seal to prevent the escape of lubricant from the interior of the hub. A cap 22 may be screwed or otherwise fixed upon the member 1 to similarly confine the lubricant on that side.

Figure 3:
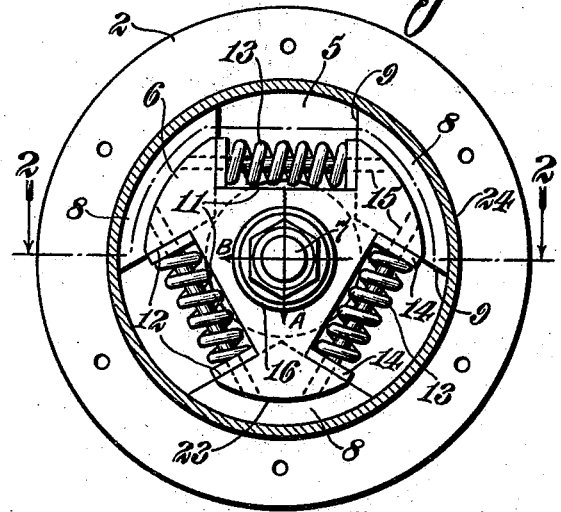
Figure 3 is a section on line 3—3 of Figure 2.

It will be seen that this structure forms an efficient, yielding suspension for the axle within the hub of the wheel. The springs 13 together with the members 14 engaging the abutments 12 and 9, will yieldingly center the axle in the hub through their tendency to maintain the abutments 9 and 12 in alinement with each other. Should a force be applied to the axle, say in the direction of the arrow A, said force will be resisted by the two lower springs 13 of Figure 3. When this force becomes great enough to compress the springs, the movable member 6 will move downwardly, the upper spring 13 and members 14 will slide along the vertical abutments 9, while the lower member 14 will slide outwardly along the lower inclined abutments 9. If the force be applied in the direction of the arrow B, the upper spring 13 will be compressed while the lower springs 13 will be partially compressed, the members 14 sliding along the inclined abutments 9 in a direction to the left of Figure 13.

The movement is limited in any direction by the engagement of the outer faces 23 with the rim 24 of the hub. The movement is thus positively limited so that any jamming of the springs by an excessive load is impossible. When all forces are removed, the springs will force the movable member 6 and the axle into a central position with respect to the hub by their tendency to bring the abutments 9 and 12 into alinement. During the movement of the member 6, said member is guided by the faces 10 so as to maintain it in alinement with the hub and therefore with the wheel. The space surrounding the member 6 is filled with lubricant for the various sliding surfaces, said lubricant being prevented from escaping by the disc 17 which at the same time allows play for the axle. Torque may be transmitted from the axle to the wheel through the member 6, the springs 13 and the members 8 in an obvious manner.

It is obvious that various changes may be made in the details of construction without departing from the spirit of this invention; it is, therefore, to be understood that this invention is not to be limited to the specific details shown and described.

Having thus described this invention, what is claimed is:

1. In a spring wheel and axle, a hub fixed to the wheel, a movable member fixed to the axle, abutments on said hub, abutments on said member adapted for alinement with said first abutments and yielding means mounted on said member and engaging the abutments thereon, adapted to engage the abutments on said hub, to yieldingly aline said abutments in order to center the axle in said hub.

2. In a spring wheel and axle, a hub fixed to the wheel, a movable member fixed to the axle, abutments on said hub, abutments on said member adapted for alinement with said first abutments and yielding means mounted on said member and engaging the abutments thereon, adapted to slidably engage the abutments on said hub, to yieldingly aline said abutments in order to center the axle in said hub.

3. In a spring wheel and axle, a hub fixed to the wheel, a movable member fixed to the axle, abutments on said hub, abutments on said member, and yielding connections between said abutments tending to maintain the same in alinement.

4. In a spring wheel and axle, a hub fixed to the wheel, a movable member fixed to the axle, abutments on said hub, abutments on said member, and yielding connections between said abutments tending to maintain the same in alinement and adapted thereby to yieldingly center the axle in said hub.

5. In a spring wheel and axle, a hub fixed to the wheel, a movable member fixed to the axle, abutments on said hub, abutments on said member, and yielding means including a plate engaging said abutments adapted to center the axle in said hub.

6. In a spring wheel and axle, a hub fixed to the wheel, a movable member fixed to the axle, abutments on said hub, abutments on said member, and yielding means including a plate engaging said abutments adapted to yieldingly aline said abutments to center the axle in said hub.

7. In a spring wheel and axle, a hub fixed to the wheel, means on said hub adapted to provide abutments and guides, a movable member fixed to the axle and engaging said guides, abutments on said member and yielding means engaging said abutments adapted to center the axle in said hub.

8. In a spring wheel and axle, a hub fixed to the wheel, means on said hub adapted to provide abutments and guides, a movable member fixed to the axle and engaging said guides, abutments on said member and yielding means including a plate engaging said abutments adapted to center the axle in said hub.

9. In a spring wheel, a hub fixed to the wheel, abutments on said hub, a movable member fixed to the axle and provided with mutually opposed abutments adapted for alinement with said hub abutments, and yielding means engaging said hub abutments and said member abutments, adapted to yieldingly aline said abutments to center the axle in said hub.

10. In a spring wheel, a hub fixed to the wheel, abutments on said hub, a movable plate fixed to the axle and having notches adapted to provide abutments, and yielding means engaging said hub abutments and said plate abutments adapted to center the axle in said hub.

In testimony whereof I affix my signature this 28th day of July, 1920.

GEORGE M. HENRIE.